United States Patent [19]
Yoshida

[11] Patent Number: 5,940,199
[45] Date of Patent: Aug. 17, 1999

[54] INTERFACE UNIT AND INFORMATION PROCESSING APPARATUS HAVING THE INTERFACE UNIT

[75] Inventor: Shinji Yoshida, Kawasaki, Japan

[73] Assignee: Fujitsu Limited, Kawasaki, Japan

[21] Appl. No.: 08/769,406

[22] Filed: Dec. 19, 1996

[30] Foreign Application Priority Data

Dec. 26, 1995 [JP] Japan .................................. 7-339714

[51] Int. Cl.⁶ ................................................ H04B 10/00
[52] U.S. Cl. ........................................... 359/163; 359/147
[58] Field of Search .................... 359/109, 147, 359/163, 172

[56] References Cited

U.S. PATENT DOCUMENTS 5,387,993  2/1995  Heller et al. ............................ 359/172
5,617,236  4/1997  Wang et al. ............................. 359/172

*Primary Examiner*—Kinfe-Michael Negash
*Attorney, Agent, or Firm*—Staaas & Halsey

[57] ABSTRACT

An interface unit includes an optical interface circuit outputting a transmitting signal for driving an optical driver in response to input data, a serial interface circuit outputting a transmitting signal for driving a serial driver in response to the input data, a terminal for outputting a signal, and a circuit part for selectively outputting the transmitting signal from one of the optical interface circuit and the serial interface circuit via the terminal, so that at least a pulse width of the transmitting signal output via the terminal satisfies a standard established with respect to the optical driver when the output transmitting signal of the optical interface circuit is output via the terminal.

22 Claims, 11 Drawing Sheets

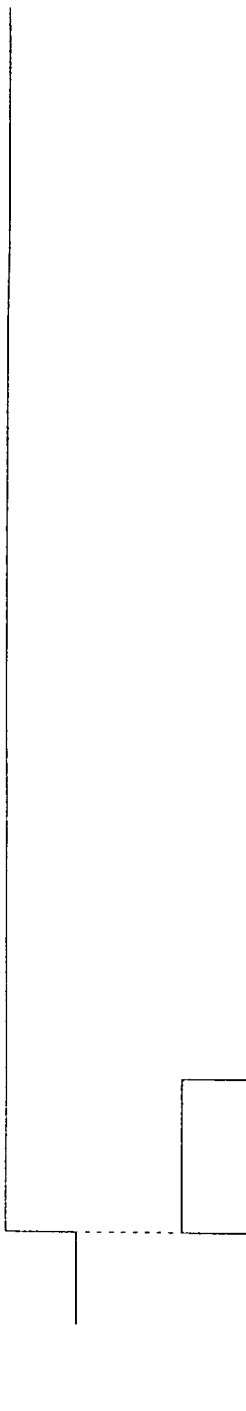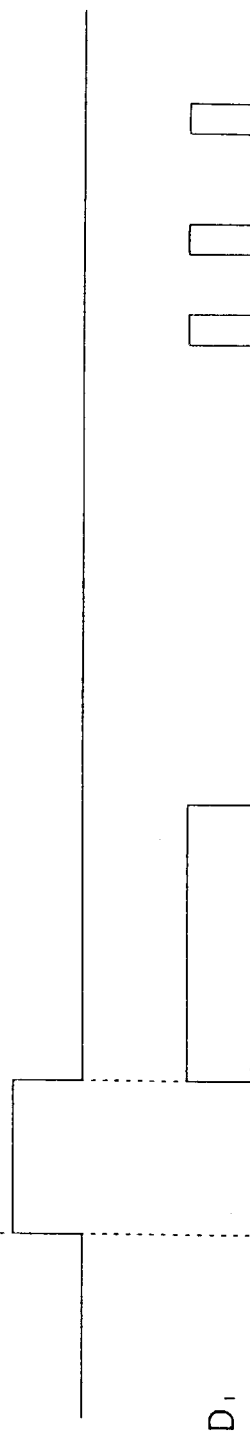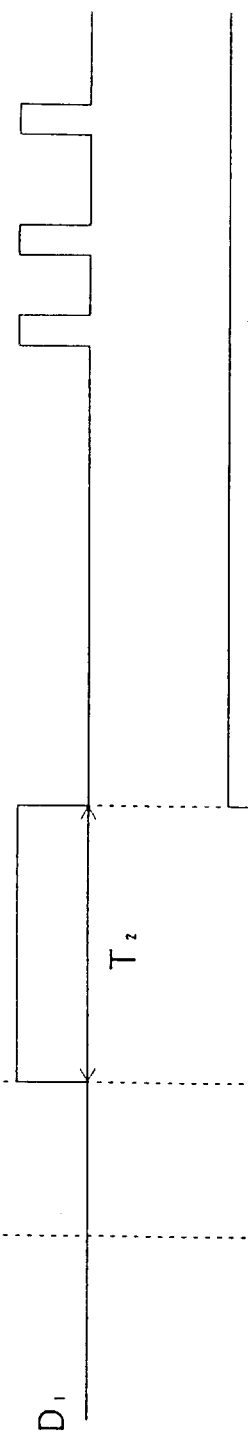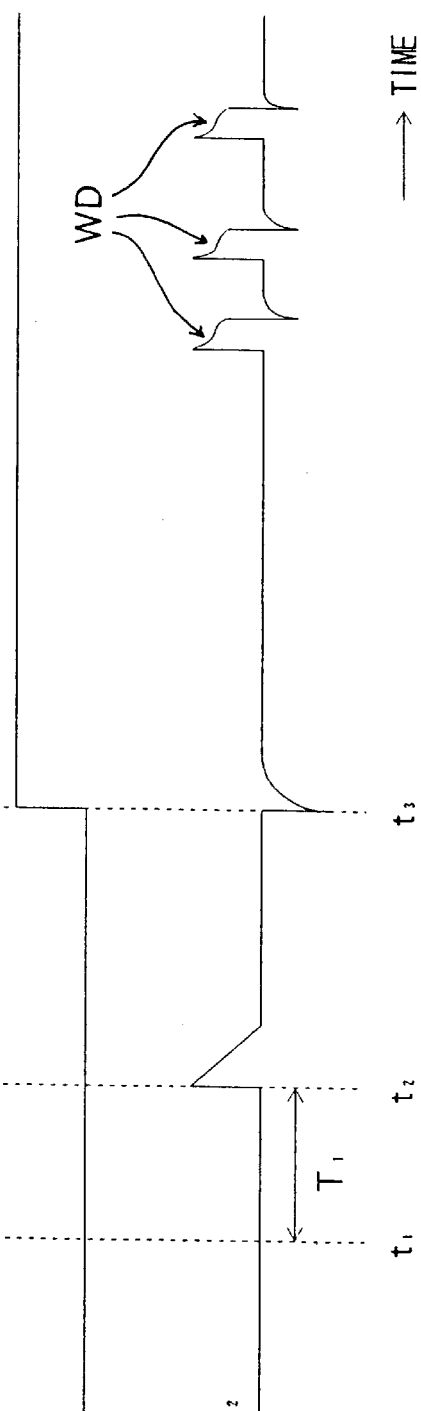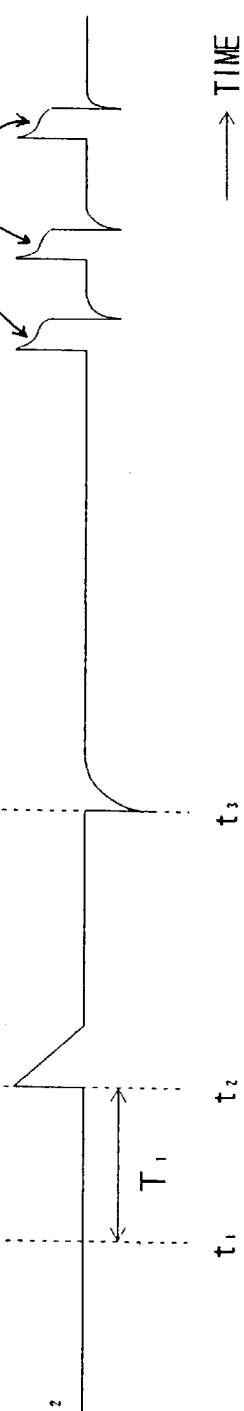

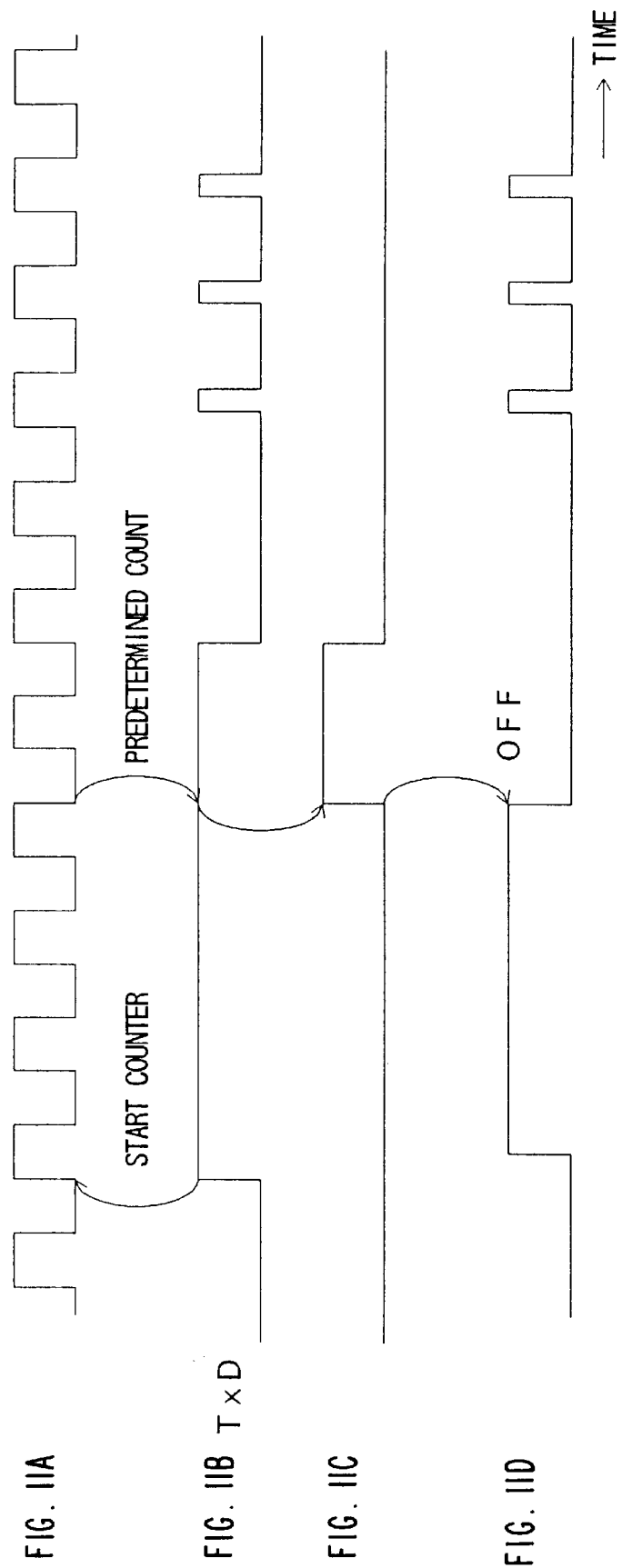

INTERFACE UNIT AND INFORMATION PROCESSING APPARATUS HAVING THE INTERFACE UNIT

BACKGROUND OF THE INVENTION

The present invention generally relates to interface units and information processing apparatuses, and more particularly to an interface unit which includes an infrared ray (IR) interface circuit and a serial interface circuit and to an information processing apparatus having such an interface unit.

Recently, due to the development of computer systems and electronic equipment, data communications are frequently made among a plurality of equipment, and there are demands to realize communication functions using an infrared ray so as to eliminate the need for connections using cables or the like.

When making the data communication, it is desirable that the communication can be made among equipment regardless of the manufacturers of the equipment. For this reason, an Infrared Data Association (IrDA) standard has been established with respect to the communication functions using the infrared ray.

On the other hand, in the computer systems and electronic equipment, an input/output controller is provided with both a serial interface circuit and an IrDA interface circuit so that either one may be used by switching the interface circuits, so as to cope with various kinds of interfaces.

FIG. 1 shows a system block diagram of an example of a conventional personal computer.

A personal computer 1 shown in FIG. 1 has an interface in conformance with the IrDA standard, and includes a central processing unit (CPU) 2 which processes data, an input/output (I/O) controller 3 which carries out a signal conversion for making a connection between the CPU 2 and an external equipment, a D.C. component cutting circuit 4 which cuts a D.C. component from a transmitting signal output from the I/O controller 3, an infrared ray (IR) driver 5 which emits an infrared ray depending on the transmitting signal obtained via the D.C. component cutting circuit 4, and a system reset circuit 6 which generates a system reset signal for resetting the system, that is, the personal computer 1, by detecting an ON state of a power supply. This system reset signal is supplied to the CPU 2.

The I/O controller 3 includes a CPU interface circuit 3a, an IR interface circuit 3b, a serial interface circuit 3c, a switch 3d, and an interface selection circuit 3e. The CPU interface circuit 3a connects the I/O controller 3 and the CPU 2. The IR interface circuit 3b generates the transmitting signal for driving the IR driver 5. The serial interface circuit 3c generates a transmitting signal for driving a serial driver (not shown) if provided. The switch 3d is used to select the IR interface circuit 3b or the serial interface circuit 3c. The interface selection circuit 3e switches the connection of the switch 3d depending on an instruction from the CPU interface circuit 3a.

Terminals 301 and 302 are provided on the I/O controller 3 for inputting and outputting signals with respect to the I/O controller 3. Of course, the I/O controller 3 is provided with other terminals which are not shown in FIG. 1. In order to reduce the number of terminals of the I/O controller 3, the terminal 301 is used in common by the IR interface circuit 3b and the serial interface circuit 3c for outputting the transmitting signal to the corresponding one of the IR driver 5 and the serial driver. Similarly, the terminal 302 is used in common by the IR interface circuit 3b and the serial interface circuit 3c for inputting a signal from the corresponding one of the IR driver 5 and the serial driver. In other words, the terminals 301 and 302 are used in common by the IR interface circuit 3b and the serial interface circuit 3c, so that the number of pins corresponding to the terminals of the I/O controller 3 is minimized when the I/O controller 3 is made up of a single integrated circuit (IC) chip.

FIGS. 2(A) through 2(E) show examples of signal waveforms at various parts of the conventional personal computer shown in FIG. 1. FIG. 2(A) shows a power supply voltage, FIG. 2(B) shows a system reset signal, and FIG. 2(C) shows an output transmitting signal $TxD_1$ of the I/O controller 3. In addition, FIG. 2(D) shows an output interface switching signal output of the interface selection circuit 3e, and FIG. 2(E) shows an output transmitting signal $TxD_2$ of the D.C. component cutting circuit 4.

When the power supply of the personal computer 1 is turned ON at a time $t_1$ as shown in FIG. 2(A), the system reset circuit 6 outputs the system reset signal shown in FIG. 2(B) at a time $t_2$ which is a predetermined time $T_1$ after the time $t_1$. The CPU 2 executes the process of a starting software when the CPU 2 receives the system reset signal from the system reset circuit 6 at the time $t_2$.

The system reset signal from the system reset circuit 6 is also supplied to the interface selection circuit 3e, so as to select the serial interface circuit 3c. That is, the connection of the switch 3d is switched from a contact a to a contact b in response to the interface switching signal shown in FIG. 2(D) from the interface selection circuit 3e, and the serial interface circuit 3c is selected. The serial interface circuit 3c is designed in conformance with a standard so that the serial interface circuit 3c normally outputs a high-level signal. For this reason, the level of the output transmitting signal $TxD_1$ of the I/O controller 3 becomes high at the time $t_2$ as shown in FIG. 2(C). When the process of the starting software of the CPU 2 ends at a time $t_3$, the CPU 2 supplies to the CPU interface circuit 3a an instruction for selecting the IR interface circuit 3b which is set by software.

The CPU interface circuit 3a issues an instruction for selecting the IR interface circuit 3b with respect to the interface selection circuit 3e depending on the instruction received from the CPU 2. The interface selection circuit 3e switches the connection of the switch 3d from the contact b to the contact a by outputting the interface switching signal in response to the instruction from the CPU interface circuit 3a, so as to select the IR interface circuit 3b.

The IR interface circuit 3b generates a transmitting signal from the data received from the CPU 2 via the CPU interface circuit 3a. This transmitting signal generated from the IR interface circuit 3b is supplied to the IR driver 5 via the D.C. component cutting circuit 4 as a driving signal which will not put an infrared ray emitting element of the IR driver 5 in a continuous light emission state so as to conform to the IrDA standard.

During the time $T_2$ between the times $t_2$ and $t_3$ when the CPU 2 carries out the process of the starting software, the serial interface circuit 3c is selected. According to the RS232C interface standard, the serial interface circuit 3c is constructed to output a high-level signal in the normal state. Hence, the output transmitting signal $TxD_2$ of the D.C. component cutting circuit 4 continues a high level during the time $T_2$.

On the other hand, according to the IrDA standard, the IR driver 5 is designed to emit the infrared ray from the infrared ray emitting element in response to a high-level transmitting signal from the I/O controller 3. For this reason, the infrared ray emitting element within the IR driver 5 continues to emit the infrared ray between the times $t_1$ and $t_2$ if no measures are taken to prevent such a continuous emission of the infrared ray. Hence, the D.C. component cutting circuit 4 is provided on the input side of the IR driver 5 in order to prevent continuous emission from the infrared ray emitting element because the continuous emission would shorten the serviceable life of the infrared ray emitting element and damage the infrared ray emitting element.

It is of course possible to use an infrared ray emitting element which is uneasily damaged even when the infrared ray emitting continues the emission of the infrared ray for a relatively long time. However, such an infrared ray emitting element is expensive and bulky, and is unsuited for use in an electronic equipment which must be made compact and at a low cost.

The D.C. component cutting circuit 4 includes a differentiating circuit, and takes measures so that the D.C. component will not continue in response to rising and falling edges of the transmitting signal $TxD_1$ shown in FIG. 2(C).

However, according to the conventional personal computer, the D.C. component cutting circuit 4 is provided at a stage preceding the IR driver 5. As a result, there is a problem in that the transmitting signal $TxD_1$ output from the I/O controller 3 becomes distorted in the D.C. component cutting circuit 4, as may be seen from the output transmitting signal $TxD_2$ of the D.C. component cutting circuit 4 shown in FIG. 2(E). In FIG. 2(E), waveform distortions are indicated by WD. When such a distortion occurs, there is a problem in that the transmitting signal $TxD_2$ no longer satisfies a current value which is to be supplied to the IR driver 5. That is, the pulse width and also the pulse amplitude of the transmitting signal $TxD_2$ output from the D.C. component cutting circuit 4 to be supplied to the IR driver 5 may become distorted to such an extent that the IrDA standard.

For example, the D.C. component cutting circuit 4 includes a capacitor. Hence, the characteristics of the capacitor changes with time, and it is inevitable that the output transmitting signal $TxD_2$ of the D.C. component cutting circuit 4 becomes distorted.

SUMMARY OF THE INVENTION

Accordingly, it is a general object of the present invention to provide a novel and useful interface unit and information processing apparatus, in which the problems described above are eliminated.

Another and more specific object of the present invention is to provide an interface unit and information processing apparatus which can eliminate continuous D.C. components without introducing a waveform distortion in a transmitting signal which is to be supplied to an infrared driver.

Still another object of the present invention is to provide an interface unit comprising an optical interface circuit outputting a transmitting signal for driving an optical driver in response to input data, a serial interface circuit outputting a transmitting signal for driving a serial driver in response to the input data, terminal means for outputting a signal, and means for selectively outputting the transmitting signal from one of the optical interface circuit and the serial interface circuit via the terminal means, so that at least a pulse width of the transmitting signal output via the terminal means satisfies a standard established with respect to the optical driver when the output transmitting signal of the optical interface circuit is output via the terminal means. According to the interface unit of the present invention, it is possible to prevent the transmitting signal output via the terminal means from being distorted, and also prevent damage to a light emitting element of the optical driver.

A further object of the present invention is to provide the interface unit wherein the means comprises a switching circuit selectively outputting the output transmitting signal of one of the optical interface circuit and the serial interface circuit via the terminal means, an interface selection circuit controlling the switching circuit in response to an interface determination signal, and an external control terminal, coupled to the interface selection circuit, receiving and supplying the interface determination signal to the interface selection circuit. According to the interface unit of the present invention, it is possible to select the optical interface circuit or the serial interface circuit by applying the interface determination signal to the external control terminal. For this reason, it is possible to prevent the terminal means from outputting a transmitting signal which does not conform to a standard of the optical driver or the serial driver even when the optical interface circuit and the serial interface circuit are switched in response to a reset operation or the like.

Another object of the present invention is to provide the interface unit wherein the means comprises a first switching circuit selectively inputting the input data to the optical interface circuit in a first mode and to the serial interface circuit in a second mode, a second switching circuit, including an inverter, selectively outputting the output transmitting signal of the optical interface circuit to the terminal means via the inverter in the first mode and outputting the output transmitting signal of the serial interface circuit to the terminal means in the second mode, and an interface selection circuit controlling the first and second switching circuits to one of the first and second modes in response to an instruction. According to the interface unit of the present invention, it is possible to prevent the transmitting signal output from the terminal means from continuing at a high level for a long time which would otherwise cause damage to a light emitting element of the optical driver.

Still another object of the present invention is to provide the interface unit wherein the means comprises a first switching circuit selectively inputting the input data to the optical interface circuit in a first mode and to the serial interface circuit in a second mode, where the optical interface circuit and the serial interface circuit supply the output transmitting signal thereof to the terminal means, an interface selection circuit controlling the first switching circuit to one of the first and second modes in response to an instruction, and a second switching circuit, coupled to the terminal means, blocking supply of the transmitting signal from the terminal means to the optical driver in response to a system reset signal which resets the interface unit. According to the interface unit of the present invention, it is possible to prevent the transmitting signal output from the serial interface circuit from being supplied to the optical driver via the terminal means.

A further object of the present invention is to provide the interface unit wherein the means comprises a switching circuit selectively inputting the input data to the optical interface circuit in a first mode and to the serial interface circuit in a second mode, where the optical interface circuit and the serial interface circuit supply the output transmitting signal thereof to the terminal means, an interface selection circuit controlling the switching circuit to one of the first and second modes in response to an instruction, and a circuit, coupled to the terminal means, forcibly setting the transmitting signal from the terminal means to a first logic level if the transmitting signal from the terminal means continues a second logic level for a predetermined time. According to the interface unit of the present invention, it is possible to prevent a light emitting element of the optical driver from being driven for a time exceeding the predetermined time which would otherwise damage the light emitting element.

Another object of the present invention is to provide an electronic equipment comprising an optical interface circuit outputting a transmitting signal for driving an optical driver in response to input data, a serial interface circuit outputting a transmitting signal for driving a serial driver in response to the input data, terminal means for outputting a signal, and means for selectively outputting the transmitting signal from one of the optical interface circuit and the serial interface circuit via the terminal means, so that at least a pulse width of the transmitting signal output via the terminal means satisfies a standard established with respect to the optical driver when the output transmitting signal of the optical interface circuit is output via the terminal means. According to the electronic equipment of the present invention, it is possible to prevent the transmitting signal output via the terminal means from being distorted, and also prevent damage to a light emitting element of the optical driver.

Still another object of the present invention is to provide the electronic equipment wherein the means comprises a switching circuit selectively outputting the output transmitting signal of one of the optical interface circuit and the serial interface circuit via the terminal means, an interface selection circuit controlling the switching circuit in response to an interface determination signal, and an external control terminal, coupled to the interface selection circuit, receiving and supplying the interface determination signal to the interface selection circuit. According to the electronic equipment of the present invention, it is possible to select the optical interface circuit or the serial interface circuit by applying the interface determination signal to the external control terminal. For this reason, it is possible to prevent the terminal means from outputting a transmitting signal which does not conform to a standard of the optical driver or the serial driver even when the optical interface circuit and the serial interface circuit are switched in response to a reset operation or the like.

A further object of the present invention is to provide the electronic equipment wherein the means comprises a first switching circuit selectively inputting the input data to the optical interface circuit in a first mode and to the serial interface circuit in a second mode, a second switching circuit, including an inverter, selectively outputting the output transmitting signal of the optical interface circuit to the terminal means via the inverter in the first mode and outputting the output transmitting signal of the serial interface circuit to the terminal means in the second mode, and an interface selection circuit controlling the first and second switching circuits to one of the first and second modes in response to an instruction. According to the electronic equipment of the present invention, it is possible to prevent the transmitting signal output from the terminal means from continuing at a high level for a long time which would otherwise cause damage to a light emitting element of the optical driver.

Another object of the present invention is to provide the electronic equipment wherein the means comprises a first switching circuit selectively inputting the input data to the optical interface circuit in a first mode and to the serial interface circuit in a second mode, where the optical interface circuit and the serial interface circuit supply the output transmitting signal thereof to the terminal means, an interface selection circuit controlling the first switching circuit to one of the first and second modes in response to an instruction, and a second switching circuit, coupled to the terminal means, blocking supply of the transmitting signal from the terminal means to the optical driver in response to a system reset signal which resets the electronic equipment. According to the electronic equipment of the present invention, it is possible to prevent the transmitting signal output from the serial interface circuit from being supplied to the optical driver via the terminal means.

Still another object of the present invention is to provide the electronic equipment wherein the means comprises a switching circuit selectively inputting the input data to the optical interface circuit in a first mode and to the serial interface circuit in a second mode, where the optical interface circuit and the serial interface circuit supply the output transmitting signal thereof to the terminal means, an interface selection circuit controlling the switching circuit to one of the first and second modes in response to an instruction, and a circuit, coupled to the terminal means, forcibly setting the transmitting signal from the terminal means to a first logic level if the transmitting signal from the terminal means continues a second logic level for a predetermined time. According to the electronic equipment of the present invention, it is possible to prevent a light emitting element of the optical driver from being driven for a time exceeding the predetermined time which would otherwise damage the light emitting element.

Other objects and further features of the present invention will be apparent from the following detailed description when read in conjunction with the accompanying drawings.

BRIEF DESCRIPTION OF THE DRAWINGS

FIGS. 2(A) through 2(E) respectively are time charts showing signal waveforms at various parts of the conventional personal computer shown in FIG. 1;

FIGS. 11(A) through 11(D) respectively are time charts showing signal waveforms for explaining the operation of the IR driver of the fourth embodiment.

DESCRIPTION OF THE PREFERRED EMBODIMENTS

Figure 3:
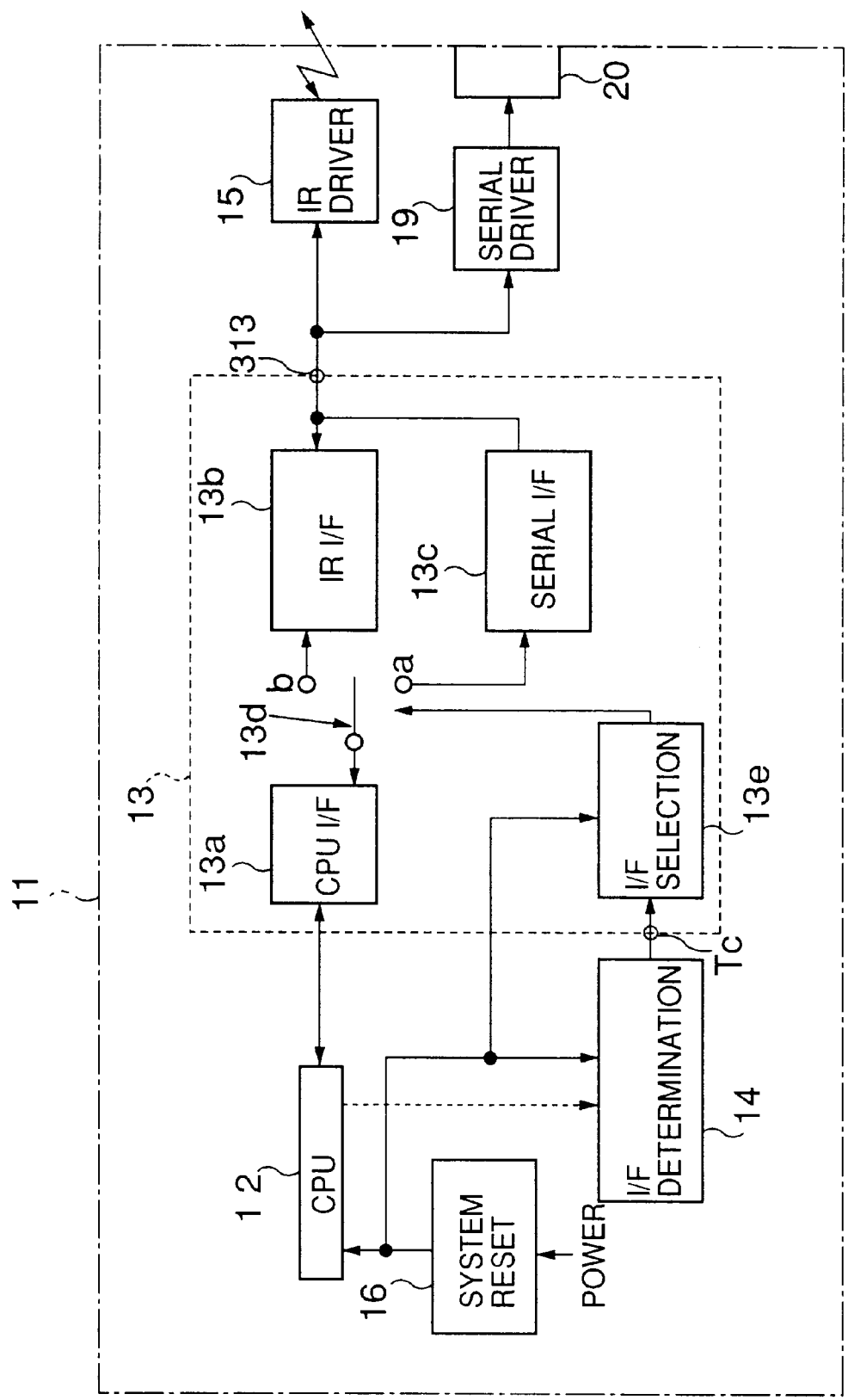
FIG. 3 is a system block diagram showing a first embodiment of an information processing apparatus according to the present invention.

FIG. 3 shows a system block diagram of a first embodiment of an information processing apparatus according to the present invention. In this embodiment of the information processing apparatus, the present invention is applied to a personal computer having an interface in conformance with an IrDA standard. In addition, this embodiment of the information processing apparatus uses a first embodiment of an interface unit according to the present invention.

In this embodiment, a personal computer 11 shown in FIG. 3 includes a CPU 12, an I/O controller 13, an interface determination circuit 14, an IR driver 15, and a system reset circuit 16. The CPU 12 carries out a data processing, and the I/O controller 13 makes a signal conversion for connecting the CPU 12 to an external equipment. The interface determination circuit 14 determines an interface to be used in response to an instruction from the CPU 12. The IR driver 15 emits an infrared ray in response to a transmitting signal output from the I/O controller 13. The system reset circuit 16 generates a system reset signal for resetting the system, that is, the personal computer 11, by detecting an ON state of a power supply. This system reset signal is supplied to the CPU 12, the I/O controller 13 and the interface determination circuit 14.

The personal computer 11 further includes a serial driver 19 and a connector 20 in this embodiment. However, it is not essential to provide the serial driver 19 and the connector 20.

The I/O controller 13 is made up of a 1-chip integrated circuit (IC) including a CPU interface circuit 13a, an IR interface circuit 13b, a serial interface circuit 13c, a switch 13d, an interface selection circuit 13e, and a plurality of terminals including an external control terminal Tc and terminal means 313. The CPU interface circuit 13a connects the I/O controller 13 and the CPU 12. The IR interface circuit 13b generates a transmitting signal for driving the IR driver 15. The serial interface circuit 13c generates a transmitting signal for driving the serial driver 19. The switch 13d is used to select the IR interface circuit 13b or the serial interface circuit 13c. The interface selection circuit 13e switches the connection of the switch 13d depending on an instruction from the CPU interface circuit 13a.

The terminal means 313 is provided on the I/O controller 13 for inputting and outputting signals with respect to the I/O controller 13. The terminal means 313 is used in common by the IR interface circuit 13b and the serial interface circuit 13c for outputting the transmitting signal with respect to the corresponding one of the IR driver 15 and the serial driver 19 and for inputting a signal from the corresponding one of the IR driver 15 and the serial driver 19. Hence, the terminal means 313 of this embodiment includes an output terminal for outputting the transmitting signal with respect to the IR driver 15 or the serial driver 19, and an input terminal for inputting the signal from the IR driver 15 or the serial driver 19. However, if the construction of the I/O controller 13 permits, the terminal means 313 may be made up of a single input/output terminal.

The external control terminal Tc is used to control the interface selection circuit 13e and is provided on the I/O controller 13. It is possible to select the IR interface circuit 13b or the serial interface circuit 13c by an interface determination signal which is supplied to the external control terminal Tc. The interface determination signal is output from the interface determination circuit 14.

The interface determination circuit 14 is connected to the CPU 12, and generates the interface determination signal depending on the instruction received from the CPU 12. This interface determination signal which determines whether the IR interface circuit 13b or the serial interface circuit 13c is to be selected, is supplied to the external control terminal Tc of the I/O controller 13.

Figure 4:
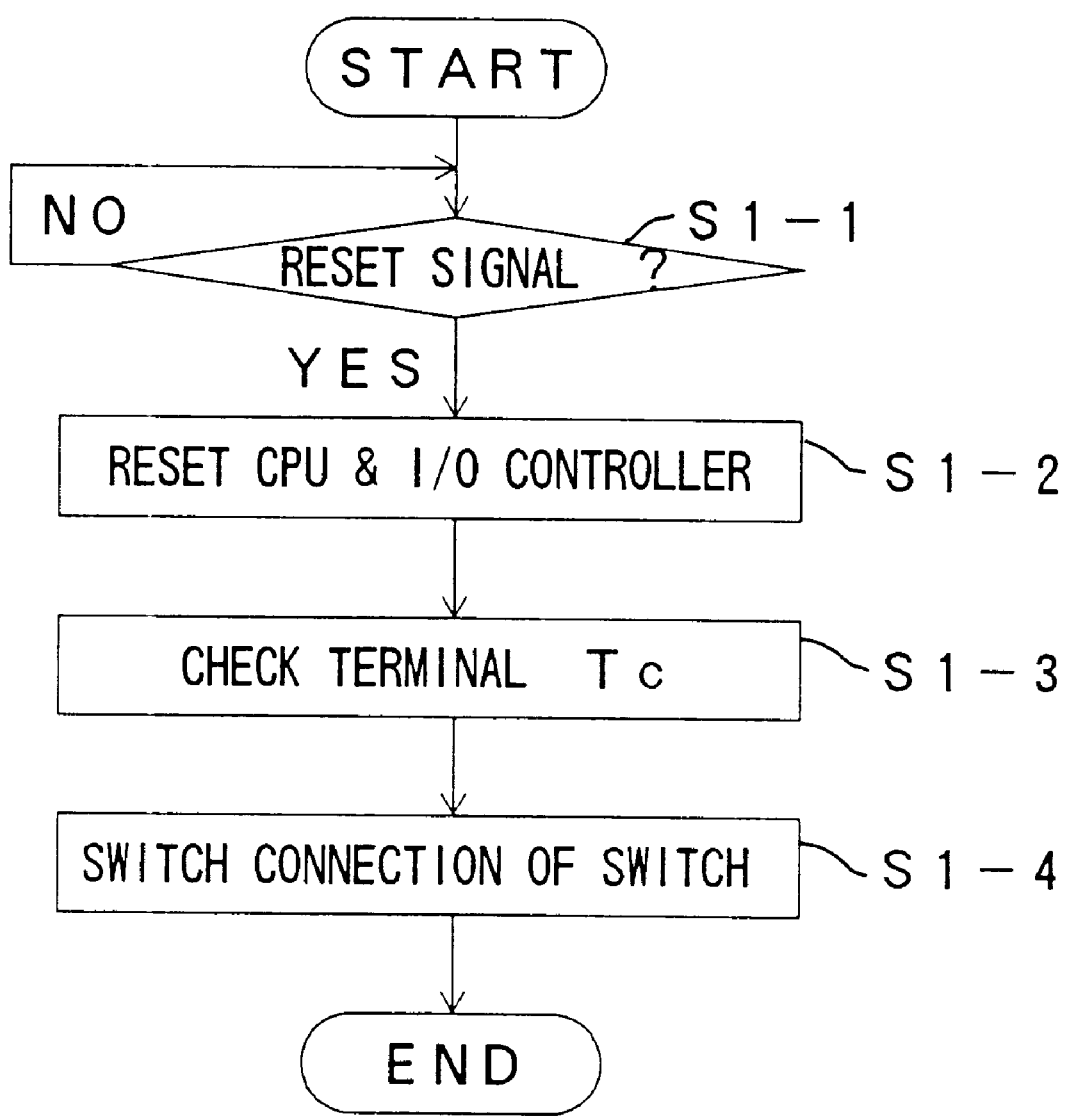
FIG. 4 is a flow chart for explaining the operation of a CPU of the first embodiment.

FIG. 4 shows a flow chart for explaining the operation of the first embodiment.

When the power supply of the personal computer 11 is turned ON, the ON state of the power supply is detected by the system reset circuit 16, and the system reset signal output from the system reset circuit 16 is supplied to the CPU 12, the I/O controller 13 and the interface determination circuit 14. A step S1-1 shown in FIG. 4 decides whether or not the system reset signal is received by the CPU 12. If the decision result in the step S1-1 becomes YES, a step S1-2 resets the CPU 12 and the I/O controller 13. In addition, a step S1-3 checks the external control terminal Tc of the I/O controller 13. The CPU 12 executes the process of a starting software when reset by the system reset signal.

When the interface determination circuit 14 receives the system reset signal from the system reset circuit 16, the interface determination circuit 14 sets a selection flag for selecting a predetermined one of the interface circuits 13b and 13c, and supplies an interface determination signal for selecting the IR interface circuit 13b to the external control terminal Tc of the I/O controller 13.

The interface selection circuit 13e of the I/O controller 13 generates a selection signal for switching the connection of the switch 13d from the contact a to the contact b depending on the interface determination signal which is received from the interface determination circuit 14 via the external control terminal Tc and selects the IR interface circuit 13b. This selection signal from the interface selection circuit 13e is supplied to the switch 13d. Hence, a step S1-4 switches the connection of the switch 13d to the contact b in response to the selection signal from the interface selection circuit 13e, and the CPU interface circuit 13a is connected to the IR interface circuit 13b.

According to this embodiment, the selection of the interface is determined by the interface determination signal which is supplied to the external control terminal Tc, even when the I/O controller 13 is reset at the time when the power supply is turned ON, for example. Hence, the serial interface circuit 13c will not be selected by the system reset operation. As a result, a high-level signal will not be supplied continuously to the IR driver 15 via the terminal means 313 when the IR interface circuit 13b is selected as the interface. Therefore, the infrared ray emitting element or the like within the IR driver 15 will not be caused to emit the infrared ray for an unnecessarily long time, and it is possible to extend the serviceable life of the infrared ray emitting element or the like within the IR driver 15. Further, since no D.C. component cutting circuit is provided at the input side of the IR driver 15, the transmitting signal supplied to the IR driver 15 via the terminal 313 will not be distorted.

Figure 5:
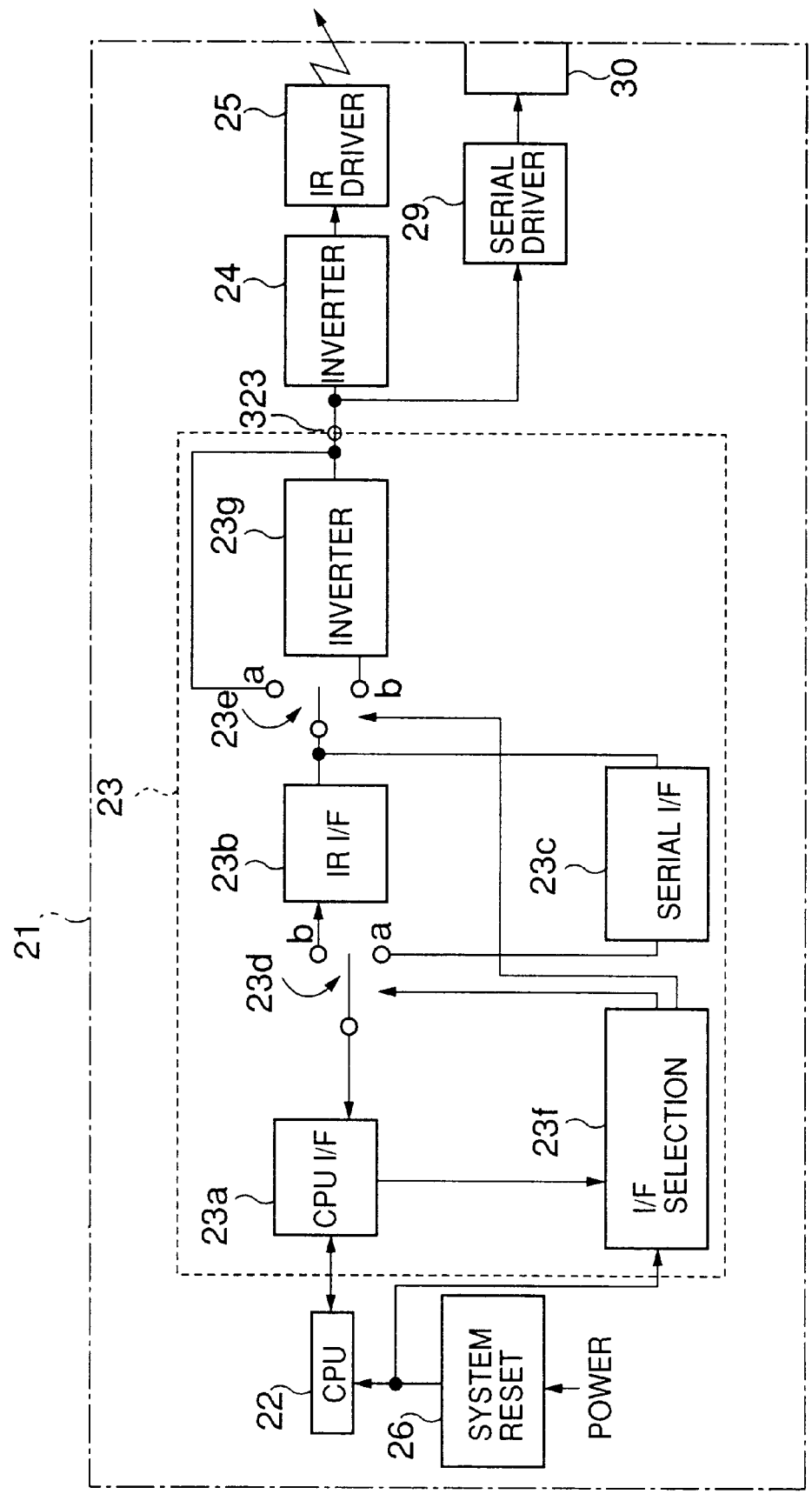
FIG. 5 is a system block diagram showing a second embodiment of the information processing apparatus according to the present invention.

FIG. 5 shows a system block diagram of a second embodiment of the information processing apparatus according to the present invention. In this embodiment of the information processing apparatus, the present invention is applied to a personal computer having an interface in conformance with an IrDA standard. In addition, this embodiment of the information processing apparatus uses a second embodiment of the interface unit according to the present invention.

In this embodiment, a personal computer 21 shown in FIG. 5 includes a CPU 22, an I/O controller 23, an inverter circuit 24, an IR driver 25, and a system reset circuit 26. The CPU 22 carries out a data processing, and the I/O controller 23 makes a signal conversion for connecting the CPU 22 to external equipment. The inverter circuit 24 is connected to the terminal means 323 of the I/O controller 23 and inverts an output signal of the I/O controller 23. The IR driver 25 emits an infrared ray in response to a transmitting signal which is output from the I/O controller 23 via the terminal means 323 and is inverted by the inverter circuit 24. The system reset circuit 26 generates a system reset signal for resetting the system, that is, the personal computer 21, by detecting an ON state of a power supply. This system reset signal is supplied to the CPU 22 and the I/O controller 23.

The personal computer 21 further includes a serial driver 29 and a connector 30 in this embodiment. However, it is not essential to provide the serial driver 29 and the connector 30.

The I/O controller 23 is made up of a 1-chip IC including a CPU interface circuit 23a, an IR interface circuit 23b, a serial interface circuit 23c, a switch 23d, a switch 23e, an interface selection circuit 23f, an inverter circuit 23g, and a plurality of terminals including terminal means 323.

The terminal means 323 is provided on the I/O controller 23 for inputting and outputting signals with respect to the I/O controller 23. The terminal means 323 is used in common by the IR interface circuit 23b and the serial interface circuit 23c for outputting the transmitting signal with respect to the corresponding one of the IR driver 25 and the serial driver 29 and for inputting a signal from the corresponding one of the IR driver 25 and the serial driver 29. Hence, the terminal means 323 of this embodiment includes an output terminal for outputting the transmitting signal with respect to the IR driver 25 or the serial driver 29, and an input terminal for inputting the signal from the IR driver 25 or the serial driver 29. However, if the construction of the I/O controller 23 permits, the terminal means 323 may be made up of a single input/output terminal.

The CPU interface circuit 23a connects the I/O controller 23 and the CPU 22. The IR interface circuit 23b generates a transmitting signal for driving the IR driver 25. The serial interface circuit 23c generates a transmitting signal for driving the serial driver 29. The switch 23d is used to switch the connection between the CPU interface circuit 23a and the IR interface circuit 23b or the serial interface circuit 23c. The switch 23e switches a path of output signals of the IR interface circuit 23b and the serial interface circuit 23c. The interface selection circuit 23f switches the connection of the switches 23d and 23e depending on an instruction from the CPU interface circuit 23a. The inverter circuit 23g is provided in one of output paths of the switch 23e, and inverts a signal output via this one output path.

The interface selection circuit 23f of the I/O controller 23 switches the connections of the switches 23d and 23e in response to an instruction received from the CPU interface circuit 23a. When the instruction for selecting the IR interface circuit 23b is received from the CPU interface circuit 23a, the interface selection circuit 23f switches the connections of the switches 23d and 23e from the contacts a to the contacts b. On the other hand, when the instruction for selecting the serial interface circuit 23c is received from the CPU interface circuit 23a, the interface selection circuit 23f switches the connections of the switches 23d and 23e from the contacts b to the contacts a.

Figure 6:
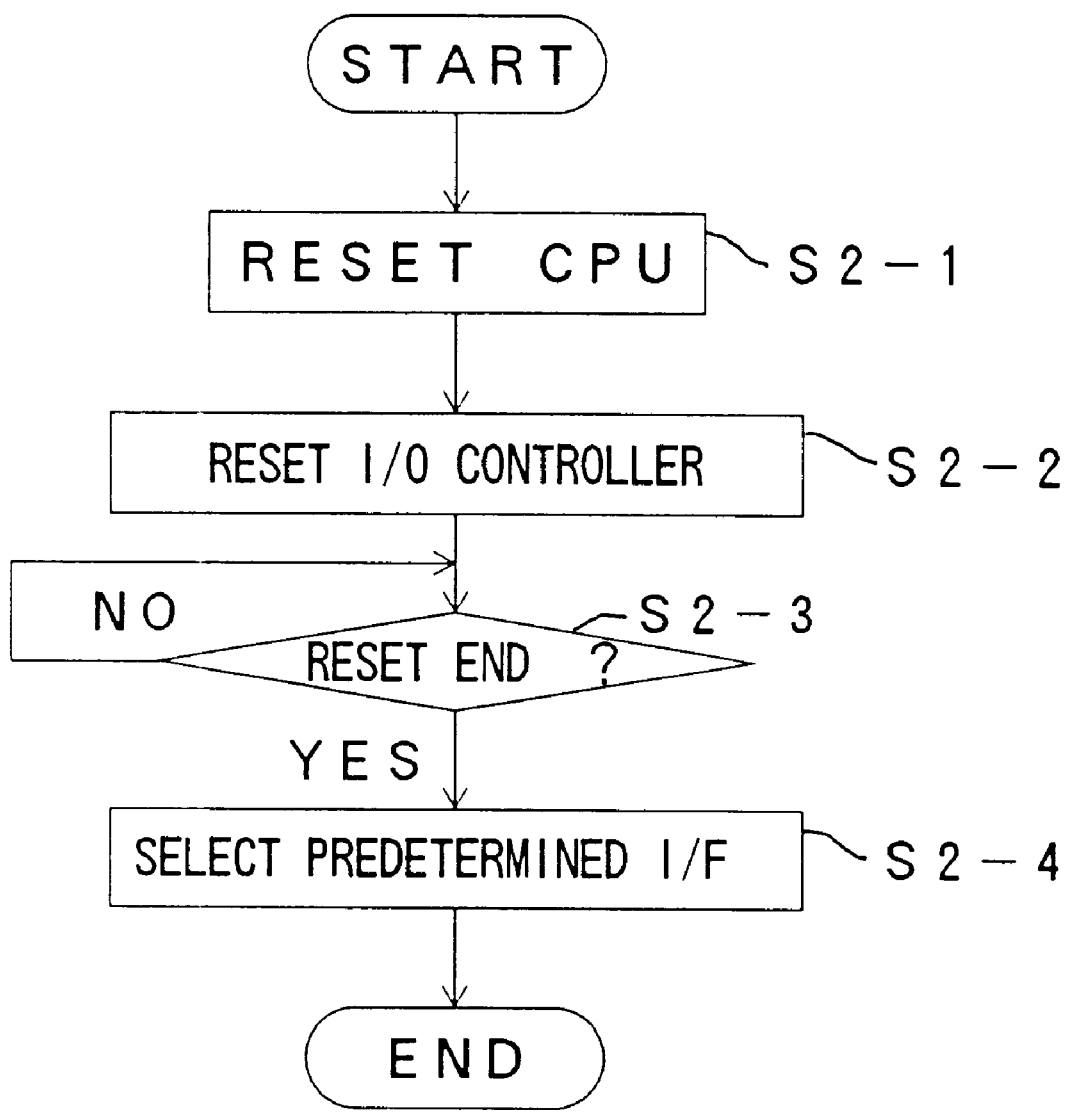
FIG. 6 is a flow chart for explaining an operation of an I/O controller of the second embodiment.

FIG. 6 shows a flow chart for explaining the operation of the second embodiment.

When the power supply of the personal computer 21 is turned ON, the ON state of the power supply is detected by the system reset circuit 26, and the system reset signal output from the system reset circuit 26 is supplied to the CPU 22 and the I/O controller 23. A step S2-1 resets the CPU 22 when the system reset signal is received from the system reset circuit 26, and the CPU 22 carries out the process of the starting software.

On the other hand, a step S2-2 resets the I/O controller 23 when the system reset signal is received from the system reset circuit 26, and the interface selection circuit 23f outputs selection signals for selecting the serial interface circuit 23c. More particularly, the interface selection circuit 23f outputs the selection signal which switches the connection of the switch 23d from the contact b to the contact a, and outputs the selection signal which switches the connection of the switch 23e from the contact b to the contact a. When the switch 23d is connected to the contact a, the output signal of the serial interface circuit 23c is supplied to the switch 23e. The serial interface circuit 23c outputs a high-level signal in this state since the serial interface circuit 23c is constructed to normally output a signal which is fixed to the high level.

The high-level signal output from the serial interface circuit 23 is output from the I/O controller 23 via the contact a of the switch 23e without passing through the inverter circuit 23g. The high-level output signal of the serial interface circuit 23c which is output from the I/O controller 23 is inverted into a low-level signal in the inverter circuit 24, and this low-level signal is supplied to the IR driver 25.

A step S2-3 decides in the CPU 22 whether or not the system reset operation is ended. When the decision result in the step S2-3 becomes YES, a step S2-4 supplies an instruction for selecting a predetermined interface from the CPU 22 to the I/O controller 23. The predetermined interface to be selected is set in advance in the program of the CPU 22, and in this embodiment, the IR interface circuit 23b is set as the predetermined interface to be selected.

More particularly, when the CPU interface circuit 23a of the I/O controller 23 receives the instruction for selecting the IR interface circuit 23b from the CPU 22, the CPU interface circuit 23a issues an instruction for switching the connections of the switches 23d and 23e to the contacts b with respect to the interface selection circuit 23f. The interface selection circuit 23f supplies the selection signals to the switches 23d and 23e so as to switch the connections thereof to the contacts b in response to the instruction from the CPU interface circuit 23a.

When the connection of the switch 23d is switched to the contact b, the CPU interface circuit 23a and the IR interface circuit 23b are connected, and a signal which does not continue a high level and conforms to the IrDA standard is output from the IR interface circuit 23b. This output signal of the IR interface circuit 23b is supplied to the switch 23e.

Since the switch 23e is connected to the contact b in this state, the output signal of the IR interface circuit 23b is supplied to the inverter circuit 23g and inverted therein. The inverted signal from the inverter circuit 23g is further inverted in the inverter circuit 24, so that the logic level of the signal output from the inverter circuit 24 is the same as that of the signal output from the I/O controller 23. Therefore, the signal supplied from the inverter circuit 24 to the IR driver 25 has the same logic level as the output signal of the IR interface circuit 23b.

According to this embodiment, the high-level signal output from the serial interface circuit 23c is supplied to the IR driver 25 via the inverter circuit 24 due to the switching of the switches 23d and 23e, even when the I/O controller 13 is reset at the time when the power supply is turned ON, for example, and the serial interface circuit 23c is selected by this system reset operation. As a result, the low-level signal from the inverter circuit 24 is supplied to the IR driver, and a high-level signal will not be supplied continuously to the IR driver 25.

In addition, the IR interface circuit 23b is selected after the system reset operation due to the switching of the switches 23d and 23e, and the signal which does not continue a high level and conforms to the IrDA standard is supplied to the IR driver 25 via the inverter circuits 23g and 24. In other words, the output signal of the IR interface circuit 23b in conformance with the IrDA standard is essentially supplied to the IR driver 25, since the logic level of the signal supplied to the IR driver 25 is the same as that of the output signal of the IR interface circuit 23b due to the provision of the two inverter circuits 23g and 24.

Therefore, a signal which has a level which is continuously high will not be supplied to the IR driver 25 when the IR interface circuit 23b is selected as the interface. For this reason, the infrared ray emitting element or the like within the IR driver 25 will not emit the infrared ray for an unnecessarily long time, and it is possible to extend the serviceable life of the infrared ray emitting element or the like within the IR driver 25. Further, since no D.C. component cutting circuit is provided at the input side of the IR driver 25, the transmitting signal supplied to the IR driver 25 via the terminal 323 will not be distorted.

Figure 7:
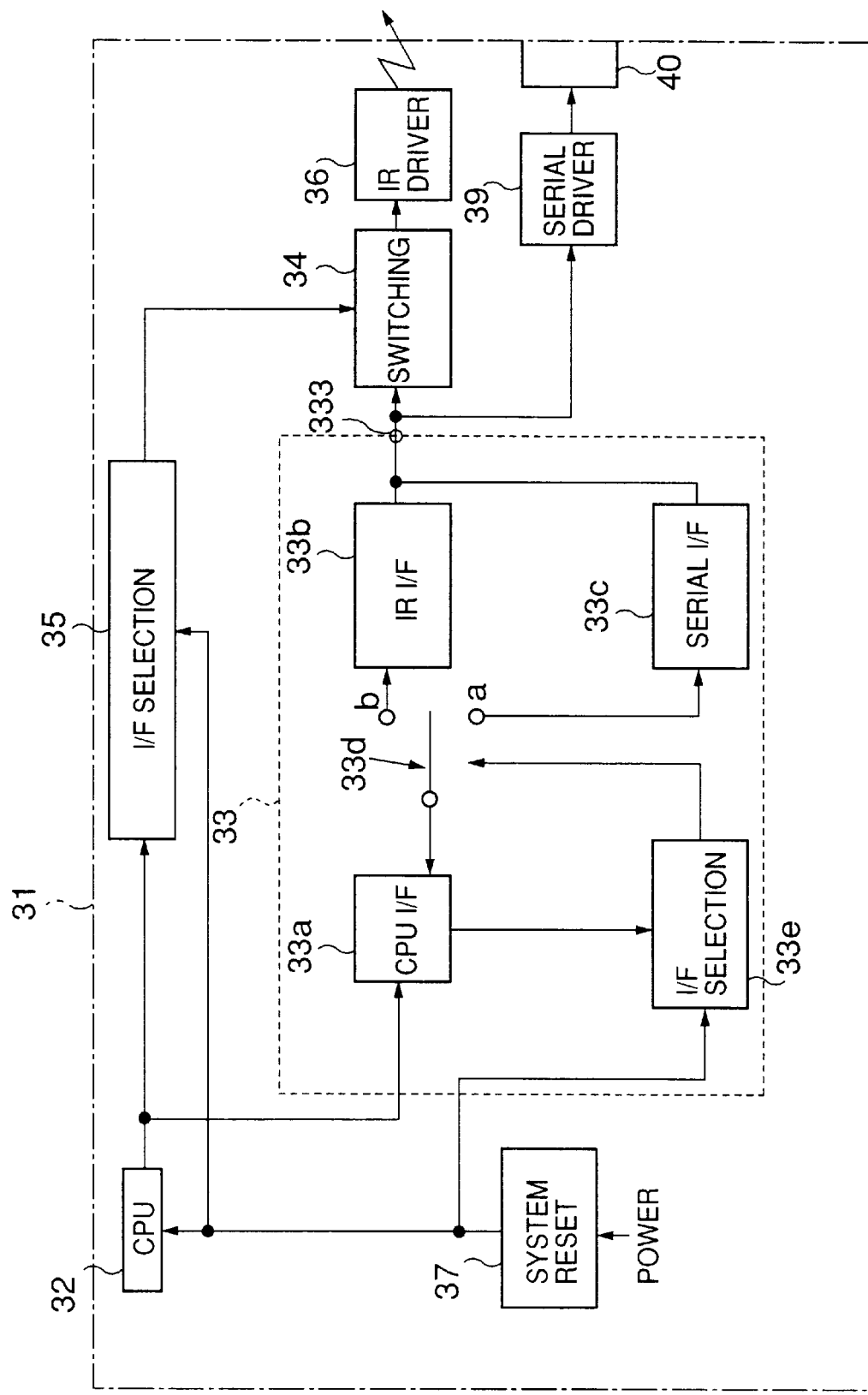
FIG. 7 is a system block diagram showing a third embodiment of the information processing apparatus according to the present invention.

FIG. 7 shows a system block diagram of a third embodiment of the information processing apparatus according to the present invention. In this embodiment of the information processing apparatus, the present invention is applied to a personal computer having an interface in conformance with an IrDA standard. In addition, this embodiment of the information processing apparatus uses a third embodiment of the interface unit according to the present invention.

In this embodiment, a personal computer 31 shown in FIG. 7 includes a CPU 32, an I/O controller 33, a switching circuit 34, an interface selection circuit 35, an IR driver 36, and a system reset circuit 37. The CPU 32 carries out a data processing, and the I/O controller 33 makes a signal conversion for connecting the CPU 32 to external equipment. The switching circuit 34 is connected to an output terminal Tout of the I/O controller 33 and controls switching of an output signal of the I/O controller 33. The interface selection circuit 35 controls the switching of the switching circuit 34 depending on a signal supplied from the CPU 32 to the I/O controller 33. The IR driver 36 emits an infrared ray in response to a transmitting signal which is output from the I/O controller 33 and is received via the switching circuit 34. The system reset circuit 37 generates a system reset signal for resetting the system, that is, the personal computer 31, by detecting an ON state of a power supply. This system reset signal is supplied to the CPU 32, the I/O controller 33 and the interface selection circuit 35.

The personal computer 31 further includes a serial driver 39 and a connector 40 in this embodiment. However, it is not essential to provide the serial driver 39 and the connector 40.

The I/O controller 33 includes a CPU interface circuit 33a, an IR interface circuit 33b, a serial interface circuit 33c, a switch 33d, an interface selection circuit 33e, and a plurality of terminals including terminal means 333.

The terminal means 333 is provided on the I/O controller 33 for inputting and outputting signals with respect to the I/O controller 33. The terminal means 333 is used in common by the IR interface circuit 33b and the serial interface circuit 33c for outputting the transmitting signal with respect to the corresponding one of the IR driver 35 and the serial driver 39 and for inputting a signal from the corresponding one of the IR driver 35 and the serial driver 39. Hence, the terminal means 333 of this embodiment includes an output terminal for outputting the transmitting signal with respect to the IR driver 35 or the serial driver 39, and an input terminal for inputting the signal from the IR driver 35 or the serial driver 39. However, if the construction of the I/O controller 33 permits, the terminal means 333 may be made up of a single input/output terminal.

Figure 1:
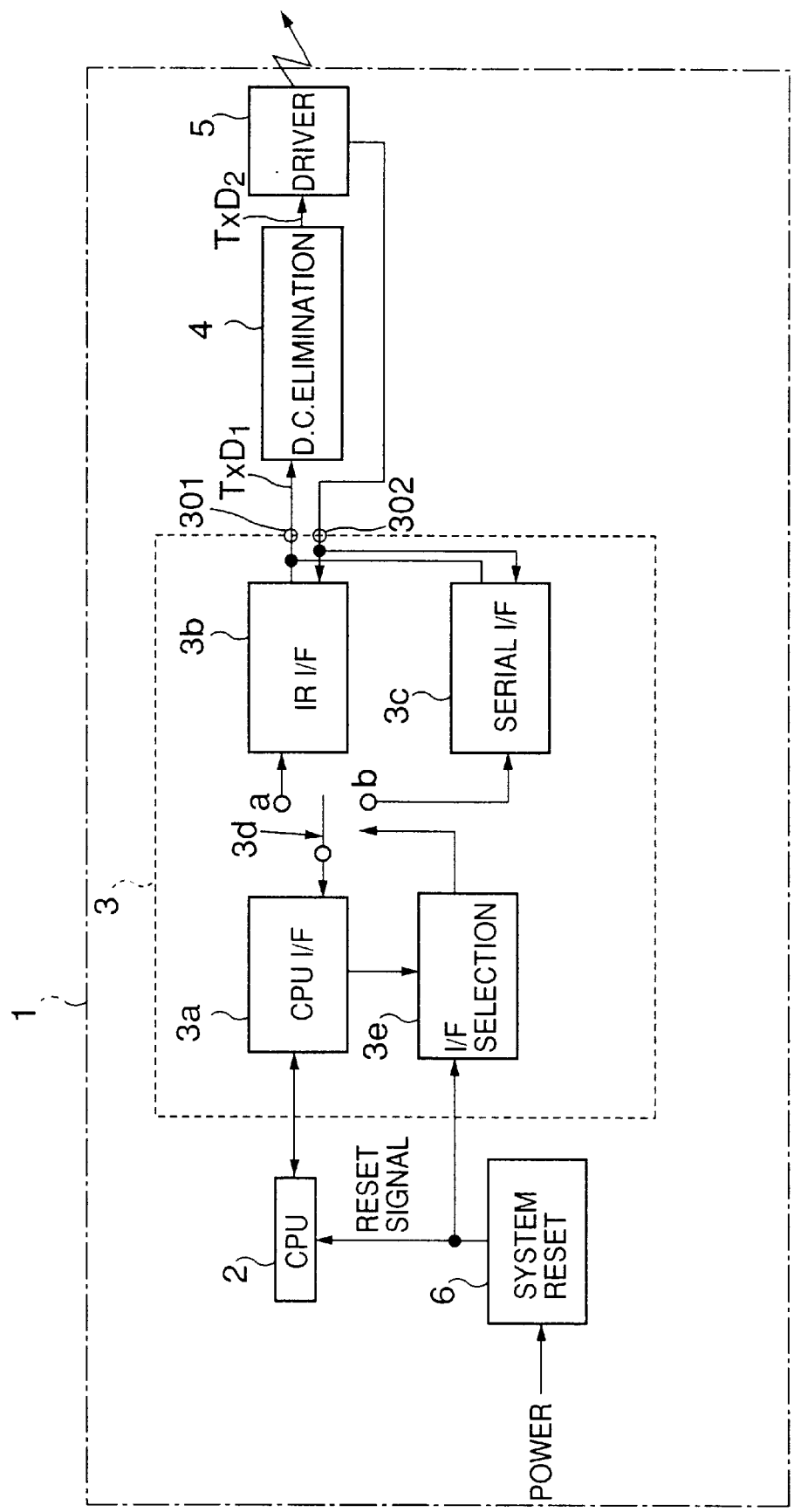
FIG. 1 is a system block diagram showing an example of a conventional personal computer having an interface unit.

The CPU 32, the I/O controller 33, the IR driver 36 and the system reset circuit 37 may have the same constructions as the corresponding parts of the conventional personal computer 1 shown in FIG. 1, and a description thereof will be omitted.

The switching circuit 34 is provided between the I/O controller 33 and the IR driver 36, and controls the connection between the I/O controller 33 and the IR driver 36 depending on a selection signal from the interface selection circuit 35.

The interface selection circuit 35 supplies to the switching circuit 34 a selection signal to turn OFF the switching circuit 34 when the I/O controller 3 is reset, so as to disconnect the I/O controller 33 from the IR driver 36. On the other hand, the interface selection circuit 35 supplies to the switching circuit 34 a selection signal to turn ON the switching circuit 34 when the IR interface circuit 33b is selected, so as to connect the I/O controller 33 and the IR driver 36.

Figure 8:
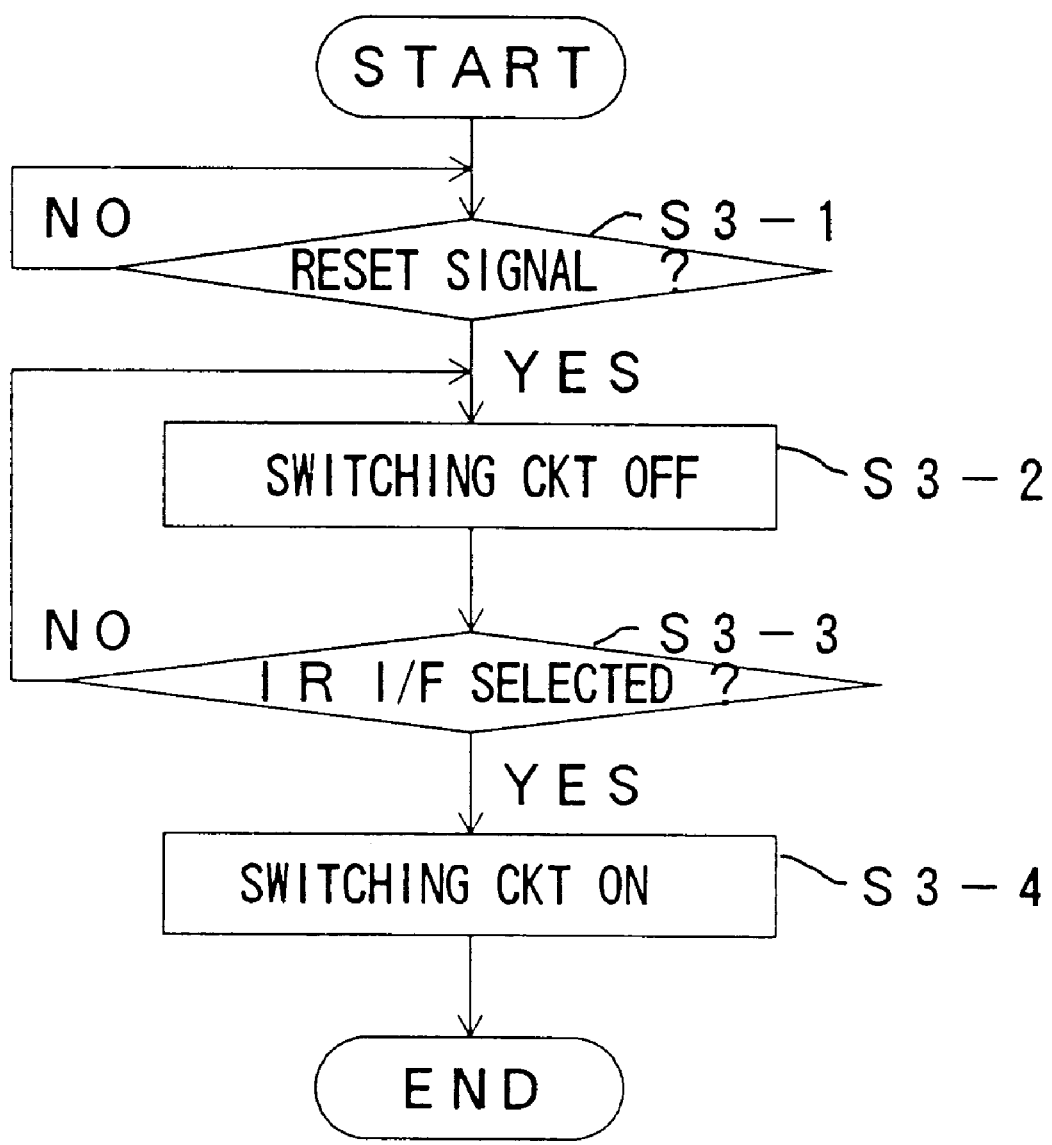
FIG. 8 is a flow chart for explaining an operation of an interface selection circuit of the third embodiment.

FIG. 8 shows a flow chart for explaining the operation of the third embodiment.

When the power supply of the personal computer 31 is turned ON, the ON state of the power supply is detected by the system reset circuit 37, and the system reset signal output from the system reset circuit 37 is supplied to the CPU 32, the I/O controller 33 and the interface selection circuit 35. A step S3-1 decides whether or not the system reset signal is received by the CPU 32, the I/O controller 33 and the interface selection circuit 35 from the system reset circuit 37. If the decision result in the step S3-1 is YES, the process advances to a step S3-2. In this step S3-2, the CPU 22 carries out the process of starting the software, the interface selection circuit 35 supplies to the switching circuit 34 the selection signal for turning OFF the switching circuit 34, and the interface selection circuit 33e of the I/O controller 33 outputs a selection signal for selecting the serial interface circuit 33c. More particularly, the interface selection circuit 33e outputs the selection signal which switches the connection of the switch 33d from the contact b to the contact a. When the switch 33d is connected to the contact a, the output signal of the serial interface circuit 33c is output from the I/O controller 33. The serial interface circuit 33c outputs a high-level signal in this state since the serial interface circuit 33c is constructed to normally output a signal which is fixed to the high level.

A step S3-3 decides in the CPU 32 whether or not the IR interface circuit 33b is to be selected as the interface. The process returns to the step S3-2 if the decision result in the step S3-3 is NO. On the other hand, if the decision result in the step S3-3 is YES, a step S3-4 supplies the selection signal for turning ON the switching circuit 34 from the interface selection circuit 35 to the switching circuit 34. Accordingly, when the system reset signal is received, the interface selection circuit 35 turns the switching circuit 34 OFF so as to disconnect the I/O controller 33 from the IR driver 36. In addition, when the IR interface circuit 33 within the I/O controller 33 is selected, the interface selection circuit 35 turns the switching circuit 34 ON so that the output signal of the I/O controller 33 is supplied to the IR driver 36.

According to this embodiment, when the I/O controller 13 is reset at the time when the power supply is turned ON, for example, the I/O controller 33 is disconnected from the IR driver 36, and the output signal of the serial interface circuit 33c will not be supplied to the IR driver 36 via the terminal means 333. As a result, a high-level signal will not be supplied continuously to the IR driver 15 when the IR interface circuit 33b is selected as the interface. Therefore, the infrared ray emitting element or the like within the IR driver 36 will not emit the infrared ray for an unnecessarily long time, and it is possible to extend the serviceable life of the infrared ray emitting element or the like within the IR driver 36. Further, since no D.C. component cutting circuit is provided at the input side of the IR driver 35, the transmitting signal supplied to the IR driver 35 via the terminal 333 will not be distorted.

For example, a known IC HC125 may be used for the switching circuit 34. The IC HC125 is a buffer circuit, and in this case, the interface selection circuit 35 is connected to a gain control terminal of this IC HC125. A low-level control signal is supplied to the gain control terminal of the IC HC125 when making the system reset operation, and a high-level signal is supplied to the gain control terminal when the system reset operation ends.

Figure 9:
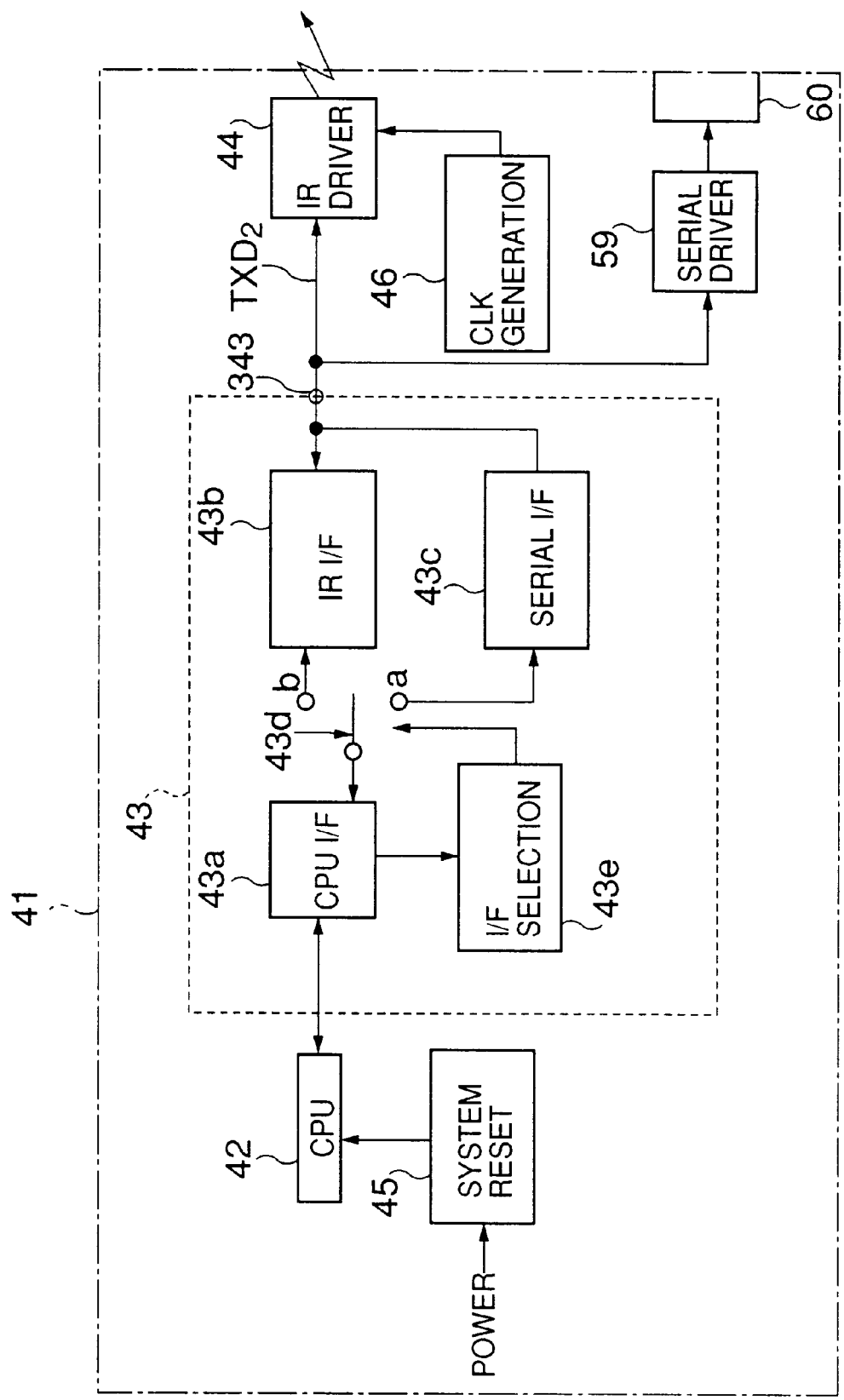
FIG. 9 is a system block diagram showing a fourth embodiment of the information processing apparatus according to the present invention.

FIG. 9 shows a system block diagram of a fourth embodiment of the information processing apparatus according to the present invention. In this embodiment of the information processing apparatus, the present invention is applied to a personal computer having an interface in conformance with an IrDA standard. In addition, this embodiment of the information processing apparatus uses a fourth embodiment of the interface unit according to the present invention.

In this embodiment, a personal computer 41 shown in FIG. 9 includes a CPU 42, an I/O controller 43, an IR driver 44, a system reset circuit 45, and a clock generation circuit 46. The CPU 42 carries out a data processing, and the I/O controller 43 makes a signal conversion for connecting the CPU 42 to an external equipment. The IR driver 44 emits an infrared ray in response to a transmitting signal which is output from the I/O controller 43. The system reset circuit 45 generates a system reset signal for resetting the system, that is, the personal computer 41, by detecting an ON state of a power supply. This system reset signal is supplied to the CPU 42. The clock generation circuit 46 generates a clock signal.

The personal computer 41 further includes a serial driver 59 and a connector 60 in this embodiment. However, it is not essential to provide the serial driver 59 and the connector 60.

The I/O controller 43 includes a CPU interface circuit 43a, an IR interface circuit 43b, a serial interface circuit 43c, a switch 43d, an interface selection circuit 43e, and a plurality of terminals including terminal means 343.

The terminal means 343 is provided on the I/O controller 43 for inputting and outputting signals with respect to the I/O controller 43. The terminal means 343 is used in common by the IR interface circuit 43b and the serial interface circuit 43c for outputting the transmitting signal with respect to the corresponding one of the IR driver 44 and the serial driver 59 and for inputting a signal from the corresponding one of the IR driver 44 and the serial driver 59. Hence, the terminal means 343 of this embodiment includes an output terminal for outputting the transmitting signal with respect to the IR driver 44 or the serial driver 59, and an input terminal for inputting the signal from the IR driver 44 or the serial driver 59. However, if the construction of the I/O controller 43 permits, the terminal means 343 may be made up of a single input/output terminal.

The CPU 42, the I/O controller 43, and the system reset circuit 45 may have the same construction as the corresponding parts of the conventional personal computer 1 shown in FIG. 1, and a description thereof will be omitted.

Figure 10:
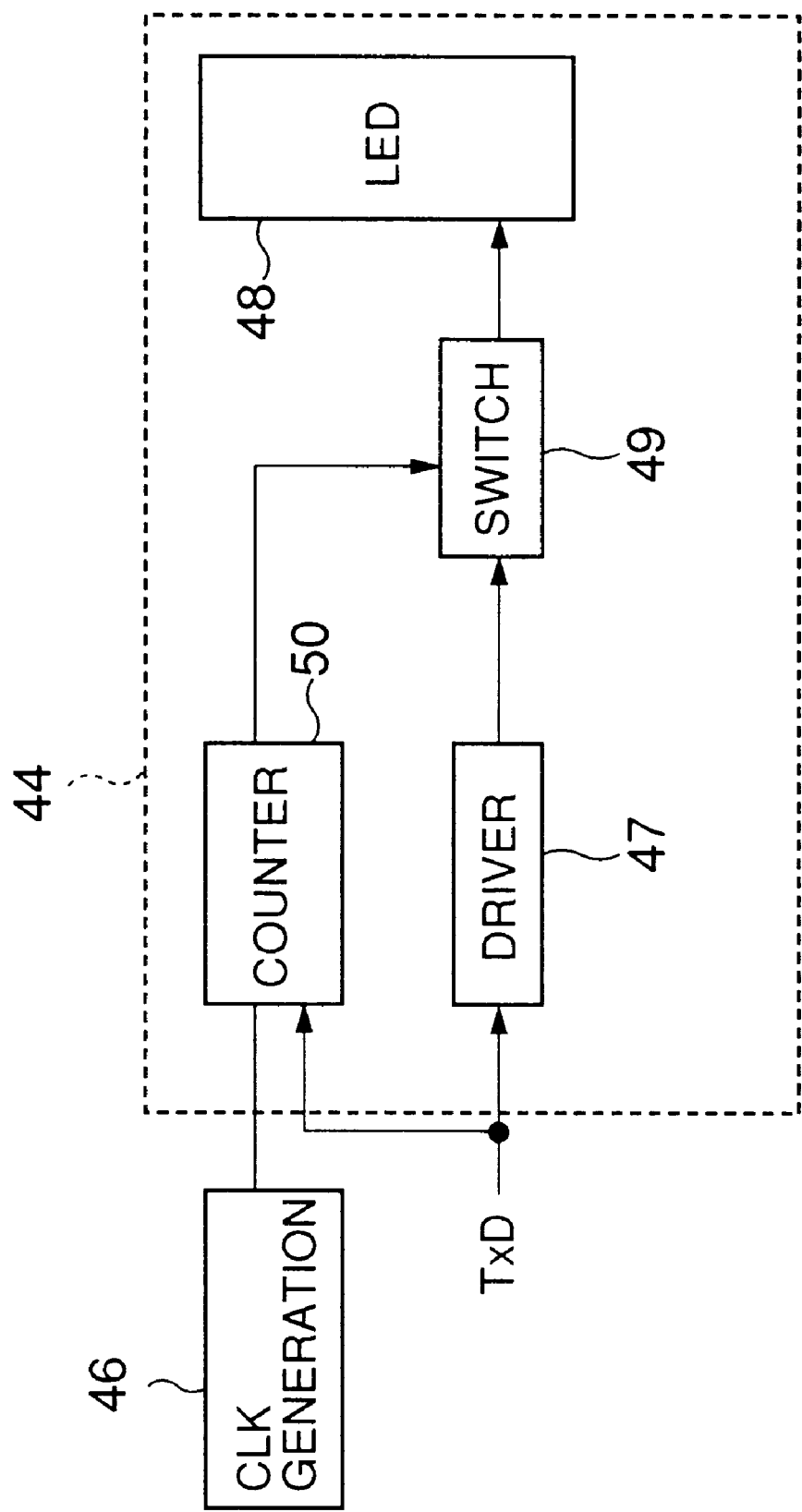
FIG. 10 is a system block diagram showing the construction of an IR driver of the fourth embodiment.

FIG. 10 shows a system block diagram of the IR driver 44 and the clock generation circuit 46 shown in FIG. 9 which form an important part of this embodiment. The IR driver 44 includes a driver 47, a light emitting diode (LED) 48, a switch 49 and a counter 50 which are connected as shown in FIG. 10. The driver 47 amplifies the transmitting signal received from the I/O controller 43 via the terminal means 343. The LED 48 emits an infrared ray depending on an output signal of the driver 47. The switch 49 is provided between the driver 47 and the LED 48 so as to control the supply of signal from the driver 47 to the LED 48. The counter 50 counts the clock signal from the clock generation circuit 46. The counting operation of the counter 50 starts in response to a rising edge of the transmitting signal received from the I/O controller 43. The switch 49 is turned OFF in response to a switch control signal which is output from the counter 50 when the counted value in the counter 50 reaches a predetermined value.

Of course, it is not essential for the counter 50 to be provided within the IR driver 44, and the counter 50 may be provided externally to the IR driver 44.

FIGS. 11(A) through 11(D) show signal waveforms at various parts of the fourth embodiment shown in FIGS. 9 and 10. More particularly, FIG. 11(A) shows the clock signal generated from the clock generation circuit 46, FIG. 11(B) shows a transmitting signal TxD output from the I/O controller 43, FIG. 11(C) shows the switch control signal output from the counter 50, and FIG. 11(D) shows the ON/OFF state of the LED 48. In FIG. 11(D), the ON state of the LED 48 is indicated by a high level, and the OFF state of the LED 48 is indicated by a low level.

According to this embodiment, when the system reset signal is supplied to the I/O controller 43 and the output signal of the serial interface circuit 43c is supplied to the IR driver 44 via the terminal means 343, the counter 50 starts to count the clock signal from the clock generation circuit 46. The switching control signal output from the counter 50 assumes a high level when the counted value reaches the predetermined value, and the switch 49 is turned OFF in response to the high-level switching control signal. Hence, the LED 48 is turned OFF after the high-level period of the transmitting signal TxD exceeds a predetermined time. For example, the switching control signal can be obtained from an output terminal of the counter 50 corresponding to a predetermined digit of the counted value. Hence, the LED 48 is turned OFF after the high-level period of the transmitting signal TxD exceeds a predetermined time. In other words, the output signal of the driver 47 is prevented from being supplied to the LED 48 by the switch 49 when the high-level period of the transmitting signal TxD exceeds the predetermined time, and the LED 48 will not emit the infrared ray for a time exceeding a predetermined value. In addition, since no D.C. component cutting circuit is provided at the input side of the IR driver 44, the transmitting signal supplied to the IR driver 44 via the terminal 343 will not be distorted.

Of course, the interface unit according to the present invention is applicable to electronic equipment other than the personal computer, such as portable electronics equipment.

Further, the present invention is not limited to these embodiments, but various variations and modifications may be made without departing from the scope of the present invention

What is claimed is:

1. An interface unit comprising:

an optical interface circuit outputting a transmitting signal driving an optical driver in response to input data;

a serial interface circuit outputting a transmitting signal driving a serial driver in response to the input data;

a terminal outputting a signal; and a circuit part selectively outputting the transmitting signal from one of said optical interface circuit and said serial interface circuit via said terminal in response to an interface determination signal, so that at least a pulse width of the transmitting signal output via said terminal satisfies a standard established with respect to the optical driver when the output transmitting signal of said optical interface circuit is output via said terminal.

2. The interface unit as claimed in claim 1, wherein said circuit part comprises:

a switching circuit selectively outputting the output transmitting signal of one of said optical interface circuit and said serial interface circuit via said terminal;

an interface selection circuit controlling said switching circuit in response to the interface determination signal; and an external control terminal, coupled to said interface selection circuit, receiving and supplying the interface determination signal to said interface selection circuit.

3. The interface unit as claimed in claim 2, wherein said optical interface circuit, said serial interface circuit, said switching circuit and said interface selection circuit are provided within a single integrated circuit chip.

4. The interface unit as claimed in claim 1, wherein said circuit part comprises:

a first switching circuit selectively inputting the input data to said optical interface circuit in a first mode and to said serial interface circuit in a second mode;

a second switching circuit, including an inverter, selectively outputting the output transmitting signal of said optical interface circuit to said terminal via the inverter in the first mode and outputting the output transmitting signal of said serial interface circuit to said terminal in the second mode; and an interface selection circuit controlling said first and second switching circuits to one of the first and second modes in response to an instruction.

5. The interface unit as claimed in claim 4, wherein said circuit part further comprises:

an inverter circuit inverting an inverted transmitting signal which is output via said terminal in the first mode prior to supply to the optical driver.

6. The interface unit as claimed in claim 4, wherein said optical interface circuit, said serial interface circuit, said first and second switching circuits and said interface selection circuit are provided within a single integrated circuit chip.

7. The interface unit as claimed in claim 1, wherein said circuit part comprises:

a first switching circuit selectively inputting the input data to said optical interface circuit in a first mode and to said serial interface circuit in a second mode, said optical interface circuit and said serial interface circuit supplying the output transmitting signal thereof to said terminal;

an interface selection circuit controlling said first switching circuit to one of the first and second modes in response to an instruction; and a second switching circuit, coupled to said terminal, blocking supply of the transmitting signal from said terminal to the optical driver in response to a system reset signal which resets said interface unit.

8. The interface unit as claimed in claim 7, wherein said optical interface circuit, said serial interface circuit, said first switching circuit and said interface selection circuit are provided within a single integrated circuit chip.

9. The interface unit as claimed in claim 1, wherein said circuit part comprises:

a switching circuit selectively inputting the input data to said optical interface circuit in a first mode and to said serial interface circuit in a second mode, said optical interface circuit and said serial interface circuit supplying the output transmitting signal thereof to said terminal;

an interface selection circuit controlling said switching circuit to one of the first and second modes in response to an instruction; and a circuit, coupled to said terminal, forcibly setting the transmitting signal from said terminal to a first logic level if the transmitting signal from said terminal continues at a second logic level for a predetermined time.

10. The interface unit as claimed in claim 9, wherein said optical interface circuit, said serial interface circuit, said switching circuit and said interface selection circuit are provided within a single integrated circuit chip.

11. The electronic equipment comprising:

an optical interface circuit outputting a transmitting signal driving an optical driver in response to input data;

a serial interface circuit outputting a transmitting signal driving a serial driver in response to the input data;

a terminal outputting a signal; and a circuit part selectively outputting the transmitting signal from one of said optical interface circuit and said serial interface circuit via said terminal in response to an interface determination signal, so that at least a pulse width of the transmitting signal output via said terminal satisfies a standard established with respect to the optical driver when the output transmitting signal of said optical interface circuit is output via said terminal.

12. The electronic equipment as claimed in claim 11, wherein said circuit part comprises:

a switching circuit selectively outputting the output transmitting signal of one of said optical interface circuit and said serial interface circuit via said terminal;

an interface selection circuit controlling said switching circuit in response to the interface determination signal; and an external control terminal, coupled to said interface selection circuit, receiving and supplying interface determination signal to said interface selection circuit.

13. The electronic equipment as claimed in claim 12, wherein said optical interface circuit, said serial interface circuit, said switching circuit and said interface selection circuit are provided within a single integrated circuit chip.

14. The electronic equipment as claimed in claim 11, wherein said circuit part comprises:

a first switching circuit selectively inputting the input data to said optical interface circuit in a first mode and to said serial interface circuit in a second mode;

a second switching circuit, including an inverter, selectively outputting the output transmitting signal of said optical interface circuit to said terminal via the inverter in the first mode and outputting the output transmitting signal of said serial interface circuit to said terminal in the second mode; and an interface selection circuit controlling said first and second switching circuits to one of the first and second modes in response to an instruction.

15. The electronic equipment as claimed in claim 14, wherein said circuit part, further comprises:

an inverter circuit inverting an inverted transmitting signal which is output via said terminal in the first mode prior to supply to the optical driver.

16. The electronic equipment as claimed in claim 14, wherein said optical interface circuit, said serial interface circuit, said first and second switching circuits and said interface selection circuit are provided within a single integrated circuit chip.

17. The electronic equipment as claimed in claim 11, wherein said circuit part comprises:

- a first switching circuit selectively inputting said input data to the optical interface circuit in a first mode and to said serial interface circuit in a second mode, said optical interface circuit and said serial interface circuit supplying the output transmitting signal thereof to said terminal;
- an interface selection circuit controlling said first switching circuit to one of the first and second modes in response to an instruction;
- a second switching circuit, coupled to said terminal, blocking supply of the transmitting signal from said terminal to the optical driver in response to a system reset signal which resets said electronic equipment.

18. The electronic equipment as claimed in claim 17, wherein said optical interface circuit, said serial interface circuit, said first switching circuit and said interface selection circuit are provided within a single integrated circuit chip.

19. The electronic equipment as claimed in claim 11, wherein said circuit part comprises:

- a switching circuit selectively inputting the input data to said optical-interface circuit in a first mode and to said serial interface circuit in a second mode, said optical interface circuit and said serial interface circuit supplying the output transmitting signal thereof to said terminal,
- an interface selection circuit controlling said switching circuit to one of the first and second modes in response to an instruction; and
- a circuit, coupled to said terminal, forcibly setting the transmitting signal from said terminal to a first logic level if the transmitting signal from said terminal continues at a second logic level for a predetermined time.

20. The electronic equipment as claimed in claim 19, wherein said optical interface circuit, said serial interface circuit, said switching circuit and said interface selection circuit are provided within a single integrated circuit chip.

21. The electronic equipment as claimed in claim 11, further comprising:

- a central processing unit issuing an instruction with respect to said circuit part controlling said circuit part and selectively outputting the transmitting signal from one of said optical interface circuit and said serial interface circuit via said terminal.

22. An interface unit comprising:

- an optical interface circuit outputting a transmitting signal for driving an optical driver in response to input data;
- a serial interface circuit outputting a transmitting signal for driving a serial driver in response to the input data; and
- a circuit selectively outputting the transmitting signal from one of said optical interface circuit and said serial interface circuit in response to an interface determination signal, so that at least a pulse width of the transmitting signal output satisfies a standard established with respect to the optical driver when the output transmitting signal of said optical interface circuit is output.

* * * * *